Aug. 8, 1933.     R. E. NAUMBURG     1,921,000
APPARATUS FOR TRANSLATING IMPRESSIONS
Filed Sept. 11, 1928     3 Sheets-Sheet 2
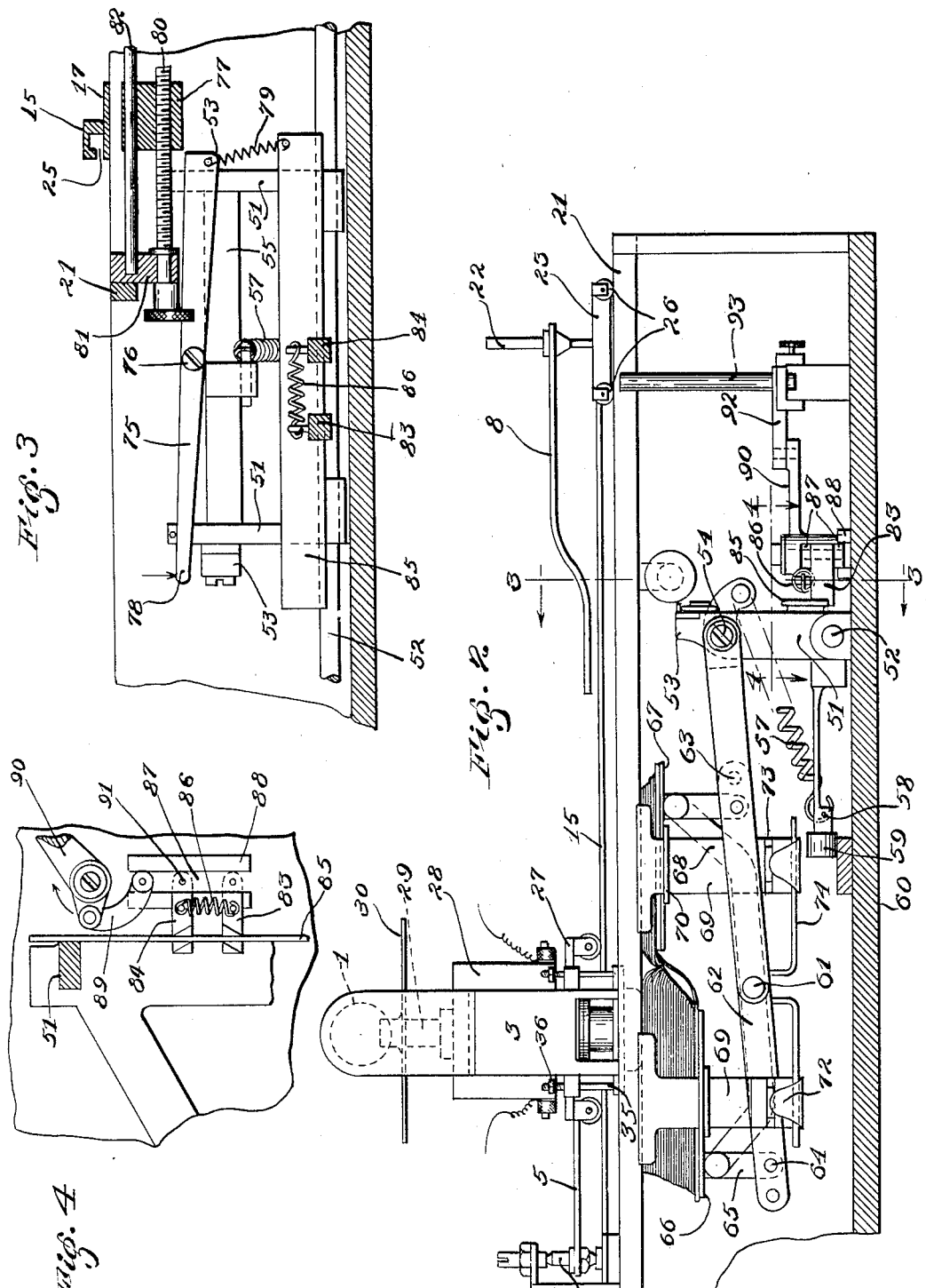
Inventor:
Robert E. Naumburg
By Roberts Cushman & Woodberry
Attys.

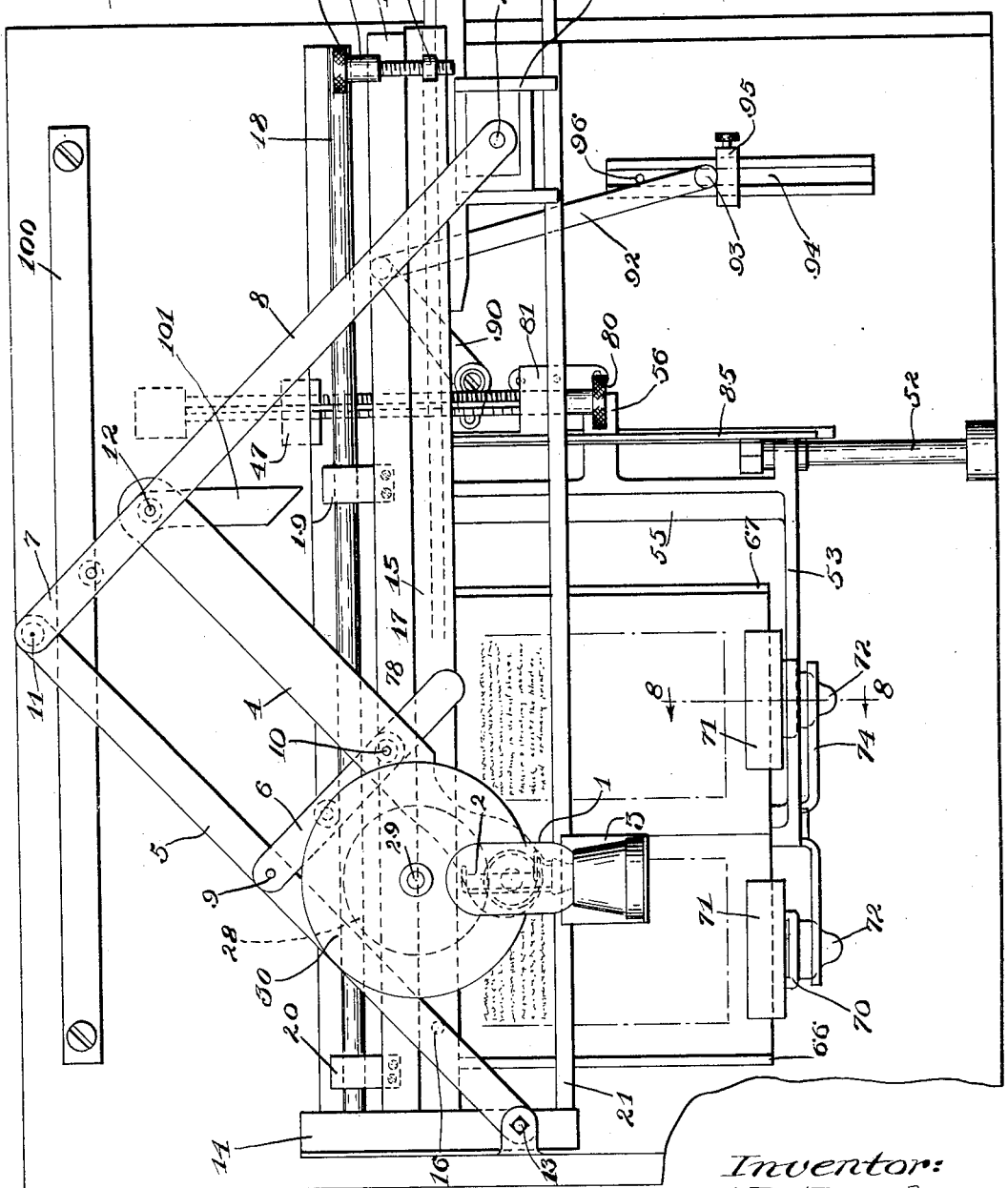

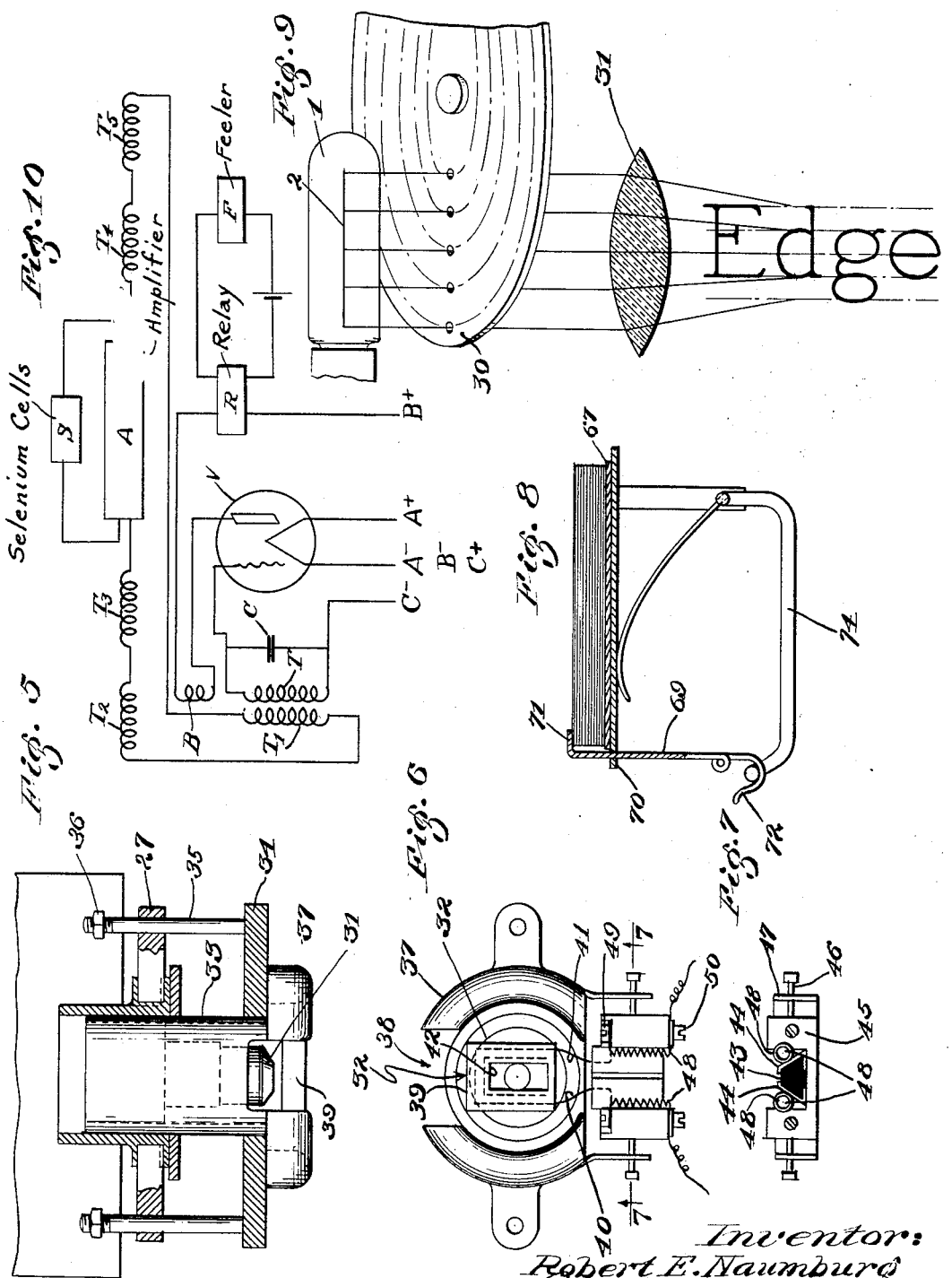

Patented Aug. 8, 1933

1,921,000

UNITED STATES PATENT OFFICE 1,921,000

APPARATUS FOR TRANSLATING IMPRESSIONS

Robert E. Naumburg, Winchester, Mass.

Application September 11, 1928
Serial No. 305,293

6 Claims. (Cl. 250—41.5)

This invention relates to apparatus for enabling the blind to perceive subject-matter, particularly to read ordinary print, and has for its objects to permit such perception by the sense of touch, like reading Braille type, to permit the reading of small type such as ordinary book or newspaper print, readily to accommodate irregularities in the alignment or spacing of lines of type or variations in the position of succeeding areas of a sheet of print on either side of the approximate plane of the sheet, to permit rapid and accurate scanning of a line of print and a quick shift from the end of one line to the beginning of a succeeding line, whether on the same page or another page, to provide facile means for reading by those who are both blind and deaf, and generally to increase the speed and facility of so-called blind reading.

In one aspect this invention comprises any suitable means for transmitting intermittent light beams of different frequencies to the subject-matter to be read, in combination with any suitable means common to the beams for producing current modified in accordance with all of the frequencies, including a selenium cell, photoelectric cell, or other light sensitive device in the path of the light of all of the beams after leaving the subject-matter, that is, after passing through the subject-matter if the sheet is transparent and the device is on the side of the sheet opposite to the light source, or after reflection if the sheet is more or less opaque and the device is on the same side as the light source, together with means (such as a wave filter) which is responsive to the aforesaid current for producing individual currents each modified in accordance with one of the aforesaid frequencies, and separate devices (such as vibrators) responsive to the individual currents respectively for manifesting the modification of the corresponding beam by the subject-matter. For example, the vibrators may be in the form of five pins or buttons arranged either in spaced relation for engagement by the tips of the different fingers respectively of one hand, or in closely grouped relation for engagement by a single finger. The aforesaid transmitting means may, for example, comprise a rectilinear light source, such as a straight filament, a revolving shutter having five (more or less) rows of differently spaced apertures in optical alignment with succeeding sections of the rectilinear filament, a condensing lens for focusing the intermittent pencils or beams of light passing through the apertures of the respective rows, the focus points being distributed vertically in a line approximately as long as the height of the longest letter to be read. Merely by interchanging shutters having the rows of apertures spaced differently, the apparatus may readily be adapted for type of any height. Typical frequencies which I have found highly satisfactory are 375, 437 1/2, 500, 562 1/2 and 625 impulses per second for the respective light beams which may be obtained with a disk shutter having 24, 28, 32, 36 and 40 apertures in the five rows of apertures respectively.

By using a single light sensitive device in the path of all beams to produce, in the same circuit, superposed current waves corresponding to the different frequencies respectively, the light sensitive device occupies a much smaller space than would a plurality of separate devices individual to the respective beams, whereby very small type may be read and the device may be located close to the subject-matter where it receives a large proportion of the diffusely reflected (or transmitted) light. And by segregating the superposed waves of the composite current into separate waves in individual circuits, the waves may be separately perceived through the sense of touch with far greater facility and accuracy than could the composite wave be interpreted if manifested, for example, as a variable musical chord.

For the purpose of illustrating the invention a concrete embodiment is shown in the accompanying drawings, in which Fig. 1 is a plan view of the entire apparatus;
Fig. 2 is a front elevation;
Fig. 3 is a section on line 3—3 of Fig. 2;
Fig. 4 is a section on line 4—4 of Fig. 2;
Fig. 5 is an axial section of the lens holder, selenium cell and floating support for these parts adapted to rest on the subject-matter;
Fig. 6 is a bottom plan view of the parts shown in Fig. 5;
Fig. 7 is a section on line 7—7 of Fig. 6;
Fig. 8 is a section on line 8—8 of Fig. 1;
Fig. 9 is a diagrammatic view; and
Fig. 10 is a suitable circuit diagram.

The particular embodiment of the invention shown in the drawings comprises a lamp 1 having a rectilinear filament 2, a bracket 3 for supporting the lamp on the end of the bar 4 which constitutes a part of a pantograph comprising the additional bars 5, 6, 7 and 8 pivoted together at 9, 10, 11 and 12, the bar 5 being pivoted at 13 to a frame comprising end member 14 and bar 15, which is pivoted at 16 to a bar 17 slidably mounted on a rod 18 by means of hollow brackets 19 and 20 fitting around the rod 18, the forward end of the end support 14 also sliding on bar 21. The forward end of the pantograph bar 8 is pivoted at 22 to a small slider 23 which slides on the bar 21 and has an integral guide blade 24 extending between the bars 15 and 17 into a recess 25 in the bar 15 (Fig. 3). As shown in Fig. 2, the slider 23 may be provided with rollers 26 to roll on the bar 21.

The carriage 27 fast on the forward end of the pantograph bar 4, which carries the lamp bracket 3, also carries a constant speed motor 28 having a vertical shaft 29 on the upper end of which is mounted a disk shutter 30. The shutter 30 has five annular rows of perforations as indicated in Fig. 9, the rows containing different numbers of perforations as stated above. The support 27 also carries a condensing lens 31 and a selenium cell 32, the lens 31 being mounted in a cylinder 33 sliding vertically in a cylindrical guide fast on the support 27 and carrying at its lower end a cross bar 34 having vertical guide pins 35 extending through guide openings in the support 27, nuts 36 being provided on the upper end of the guide pins to prevent the lens support from dropping out of the cylindrical guide. Fast on the lower end of the bar 34 is an annular rest 37 provided with an opening 38 for the insertion of the selenium cell 32. Thus the lens and selenium cell assembly floats in the support 27 and cylindrical guide so that it may rest on a printed sheet or other subject-matter to be read and remain in constant position with respect to the page along the axis of the optical system as the rest 37 slides along the printed page, even though the page may not be flat.

The selenium cell 32 comprises a moulded rectangular body 39 containing the selenium and having the two terminal conductors 40 and 41 moulded therein as shown in Fig. 6, the body 39 having a central opening 42 to permit the light to pass therethrough to the printed page, so that the light reflected from the page impinges on the body 39 at each side of the opening 42. The cell is mounted by means of the conductors 40 and 41 on a dovetail base comprising insulation 43 and conducting strips 44 fast to opposite sides of the insulation, as shown in Fig. 7. The socket for holding the selenium cell comprises the channel 45 of insulation mounted by means of screws 46 in arms 47 on the rest 37, and coil springs 48 mounted in grooves in the opposing faces of the channel member 45 by means of screws 49 and 50 at the opposite ends of the channel member, the screws 50 also serving as binding posts for the conductors leading from the selenium cell so that the circuit through the cell comprises one of the screws 50, one of the coils 48, one of the conducting pieces 44 on the dovetail guide 43, conductor 41, thence through the cell to conductor 40, the other face plate 44, the other coil spring 48 and the other binding post 50.

When using the apparatus to read a book, a floating basket such as shown in the drawings is preferably employed. This basket comprises a frame 51 slidable front and rear on the rod 52 having arms 53 pivoted thereto at 54, the two arms being interconnected by a cross piece 55 having an integral arm 56 attached to a spring 57, the other end of which is attached to the sliding frame 51 at 58, the frame also having a roller 59 rolling on a track 60. Pivoted at 61 to the free ends of the arms 53 are bars 62 tied together at their ends by rods 63 and pivoted at 64 to four upright posts 65, two of which are fast on the horizontal plate 66 for the left-hand side of the book and the other two of which are fast to the plate 67 for the right-hand side of the book. The two posts attached to each bar 62 are interconnected by an angular bar 68 which is pivoted to the posts on the sides opposite the bar 62, whereby the plates 66 and 67 are horizontal whether in the same plane or different planes. To hold the exposed pages of the book down in horizontal positions vertical slides 69 are provided, these parts sliding vertically in slotted lugs 70 projecting forwardly from the plates 66 and 67 and having lips 71 overlying the pages of the book. Finger pieces 72 are hinged at 73 to the lower ends of the slide 69, the finger pieces extending forwardly and then upwardly to form recesses for the spring pressed arms 74 (Figs. 1 and 8) and then extending forwardly to provide finger lips, whereby the slide may be raised against the action of the spring pressed arm 74.

To insert a book in the aforesaid basket the frame 51 is slid forwardly on the rod 52 until the plates 66 and 67 are exposed forwardly of the bar 21 sufficiently to lay a book on the plates, whereupon the book is engaged under the lips 71 with the left and right pages lying in the same horizontal plane as shown in Fig. 2. The basket is then depressed against the action of the spring 57 until the basket may be pushed to the rear underneath the bar 21 and the floating lens and selenium cell support 37 (Fig. 5), whereupon the basket is permitted to rise under the influence of the spring 57 until the book engages the bar 21, in which position the floating lens support 37 will be lifted from its extreme lower position to an intermediate position such as shown in Fig. 5.

To position the book with the first line of the page in the optical axis, a stop lever 75 is pivoted at 76 on the frame 51 in position to engage an adjustable stop 77 (Fig. 3) when the forward end 78 of the lever is pressed down against the action of the spring 79. The stop 77 is adjusted by means of a screw 80 rotating in a support 81 fast to the bar 21, the stop 77 sliding on rod 82 to prevent the stop from rotating. It will of course be understood that the stop 77 must be adjusted for each book, depending on the distance from the first line on a page to the bottom of the book which engages the slides 69.

After the book has been positioned as aforesaid with the first line in the optical axis, the book may be shifted upwardly one line at a time by means of the clutch shown in Figs. 1, 2 and 4. This clutch comprises two dogs 83 and 84 having oblique grooves in their upper sides to receive a flat bar 85 fast to the frame 51, the two dogs being interconnected by a spring 86 pivoted at their ends to upper and lower straps 87, the lower strap sliding in guides 88. At their rear ends the straps 87 are pivoted, through a bell-crank 89, to an arm 90 pivoted at 91, the arm 90 being pivoted to arm 92 which carries at its forward end a handle 93 extending through the arm and thence into a guide 94, an adjustable stop 95 being provided to limit the forward movement of the handle 93 and a recess 96 being provided in the guide to permit the lower end of the handle 93 to drop thereinto when moved backwardly to neutral position. When the handle 93 is moved forwardly the dogs 83 and 84 are moved to the rear, the dog 84 biting into the bar 85 and moving the book carriage 51 to the rear a distance corresponding to the line spacing as determined by the adjustment of the stop 95. If the book is advanced too far, or for use in initially adjusting the book for the first line, the book carriage may be moved forwardly by means of the dog 83 by moving the handle 93 to the rear of the recess 96.

In the event the lines of printing are not parallel with the bottom of the book, means are provided to swing the pantograph into alignment so that the reciprocatory movement of the optical axis from left to right follows the line of printing. This means comprises a screw 97 rotating in lug 98 on bar 17 and threading into a lug 99 fast to bar 15. As above described, the bar 15 is pivoted to the bar 17 at 16 so that, when the bar 15 is rotated about the pivot 16 by means of screw 97, the entire pantograph and all of the optical mechanism carried thereby, is rotated about the pivot 16, owing to the fact that the end member 14, to which one end of the pantograph is pivoted, and the slider 22 keyed to the bar 15, to which the other end of the pantograph is pivoted, are both constrained to rotate with the bar 15.

From the foregoing it will be evident that after the book is adjusted in position as aforesaid, the handle 22 of the pantograph is moved to the left until the optical axis is in line with the left-hand end of the first line of the page. The handle 22 is then slowly moved to the left so that the beams of light trace the first line of printing. After the first line has been read the handle 93 is moved forwardly from the neutral position 96 to the stop 95 to advance the next line into alignment with the optical axis. The hand 22 is then returned until the optical axis is at the left-hand end of the new line, after which these operations are repeated until the left-hand page has been read. The pantograph mechanism including end bar 31 is then moved to the right on slide bars 18 and 21 a distance approximately equal to the width of a page and the book carriage is pulled out until the first line of the right-hand page is in alignment with the optical axis, after which the aforesaid operations are repeated in reading the right-hand page, it being understood that the range of movement of the handle 22 in reading the right-hand side would be nearer the right-hand end of the guide for the slider 23. After both pages have been read, the book basket is depressed and pulled forwardly until the book clears the bar 21 sufficiently to permit a new page to be turned, it being understood that the book is momentarily released from the holding lips 71 in turning a page. Obviously stops could be provided if desired to indicate the beginning and end of the lines on both the right and left side of the book.

It will also be evident that as the slider 22 is moved to the left the pivot points 11, 12, etc. are swung upwardly to the left. In order to support the upper end of the pantograph assembly in all positions a small bar 100 is mounted under the upper end of the pantograph as shown in Fig. 1 and an angular bar 101 is mounted beneath the bars 4 and 5 at the pivots 11 and 12 with a projection extending forwardly from the pivot 12, this projection resting on the bar 100 when the slider 23 is near the left hand ends of its guides.

Fig. 10 illustrates a typical circuit arrangement in which S is the selenium cell, A an amplifier and $T_1$, $T_2$, $T_3$, $T_4$ and $T_5$ transformer primaries in the output circuit of the amplifier. With each primary is associated a secondary circuit tuned to one of the aforesaid intermittent light frequencies, one such secondary being shown in association with $T_1$. This particular circuit comprises a transformer secondary T, tuning condenser C, three element vacuum tube V, a feed-back coil B, a relay R in the plate circuit of tube V and a feeler F controlled by the relay R. The use of regeneration in the filter circuit serves to emphasize the desired frequency to the exclusion of others. The feeler F may be in the form of a buzzer operated by either pulsating current or direct current but is preferably in the form of an electromagnet which merely advances (or retracts) the aforesaid feeler contact point or button when increased current in the plate circuit actuates relay R. By causing the feeler to press against or tap the finger upon increase of current due to increased light reflection to the selenium cell, "white feeling" results; whereas by causing the feeler to pull away from the finger under such condition "black feeling" results. As above stated, the five (more or less) feeler buttons may be associated with different fingers, but for those accustomed to reading Braille type they are preferably arranged in a row to engage the practiced finger at successive points along the sensitive end of the finger. For example, the feelers may be mounted on the pantograph slider 23 to engage the forefinger through a slot in a plate support for the forefinger while the thumb and second finger control the slider. Obviously the feelers may be connected directly in the plate circuits respectively instead of being controlled through intermediate relays.

Thus it will be evident that the five (more or less) intermittent light beams produce in the selenium cell circuit a composite current comprising five superposed waves and that the tuned circuits filter out the five waves or frequencies into the individual circuits containing the feelers or other devices for manifesting the signal variations. It will also be understood that any suitable filter system may be employed including tuned relays or feelers.

I claim:

1. Apparatus for perceiving subject matter comprising means for transmitting intermittent light beams of different frequencies to the subject matter, means common to said beams for producing current modified in accordance with all of said frequencies including a light sensitive device in the path of the light of all of said beams after leaving the subject matter, means responsive to said current for producing individual currents each modified in accordance with one of said frequencies, and separate devices responsive to said individual currents respectively for manifesting the modification of the corresponding beam by the subject matter.

2. Apparatus for perceiving subject matter comprising means for transmitting intermittent light beams of different frequencies to the subject matter, electrical means for producing, in the same circuit, superposed current waves corresponding to the different frequencies respectively, including a light sensitive device in said circuit and in the path of the light of all of said beams after leaving the subject matter, means responsive to said superposed waves for producing separate waves, each modified in accordance with one of said frequencies, including a wave filter for segregating the superposed waves into separate waves in individual circuits, and a device in each of the individual circuits for manifesting the modification of the corresponding beam by the subject matter.

3. Apparatus for perceiving subject matter comprising means for transmitting intermittent light beams of different frequencies to the subject matter, means common to said beams for producing current modified in accordance with all of said frequencies including a light sensitive device in the path of the light of all of said beams after leaving the subject matter, means responsive to said current for producing individual currents each modified in accordance with one of said frequencies, and separate devices responsive to said individual currents respectively for manifesting the modification of the corresponding beam by the subject matter, said first means including a light source, a revolving shutter, and a condensing lens arranged along an optical axis transverse to the plane of the subject matter.

4. Apparatus for perceiving subject matter comprising means for transmitting intermittent light beams of different frequencies to the subject matter, means for producing current modified in accordance with all of said frequencies including a light sensitive device in the path of said beams before reaching the subject matter, the device having an opening therein for the light beams to pass to the subject matter so that the reflected light is incident to the device on opposite sides of the optical axis, and a floating support for said device having a smooth surface resting on the subject matter so that as the support moves over the subject matter, the distance between the device and the subject matter remains substantially constant notwithstanding variations in the level of succeeding portions of the subject matter.

5. Apparatus for perceiving subject matter comprising means for transmitting intermittent light beams of different frequencies to the subject matter, electrical means for producing, in the same circuit, superposed current waves corresponding to the different frequencies respectively, including light sensitive means in said circuit and in the path of the light of all of said beams after leaving the subject matter, means responsive to said superposed waves for producing separate waves, each modified in accordance with one of said frequencies, including a wave filter for segregating the superposed waves into separate waves in individual circuits, and a feeler device in each of the individual circuits for manifesting, to the sense of touch, the modification of the corresponding beam by the subject matter.

6. Apparatus for perceiving subject matter comprising means for transmitting intermittent light beams of different frequencies to the subject matter, electrical means for producing, in the same circuit, superposed current waves corresponding to the different frequencies respectively, including a light sensitive device in the path of the light of each of said beams reflected from the subject matter, means responsive to said superposed waves for producing separate waves, each modified in accordance with one of said frequencies, including a wave filter for segregating the superposed waves into separate waves in individual circuits, and a device in each of the individual circuits for manifesting the modification of the corresponding beam by the subject matter.

ROBERT E. NAUMBURG.